July 2, 1940.  J. E. POORMAN  2,206,047
TAP AND DIE HOLDER
Filed Aug. 22, 1938  3 Sheets-Sheet 3
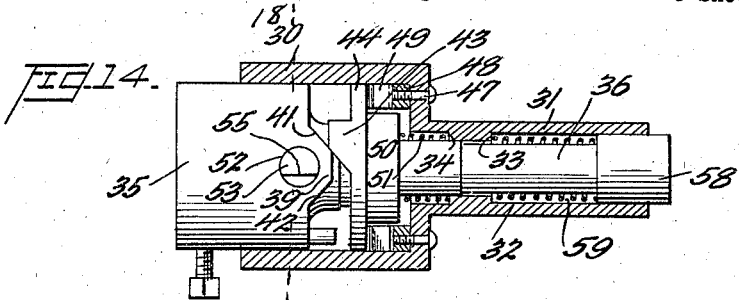
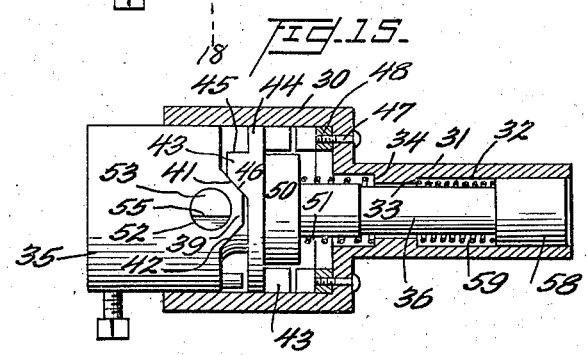
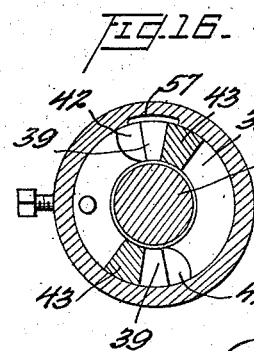
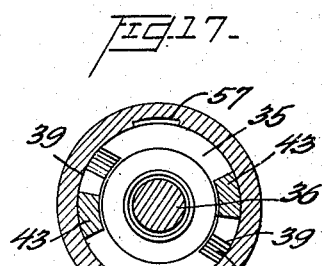
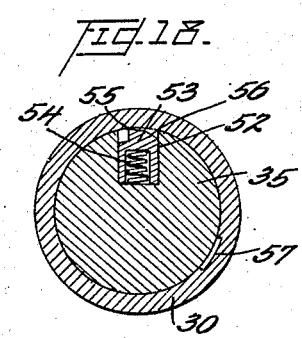
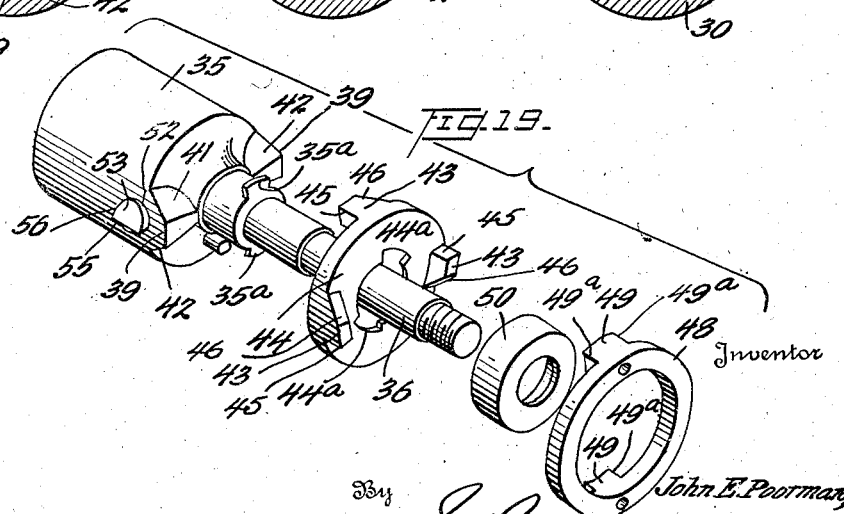

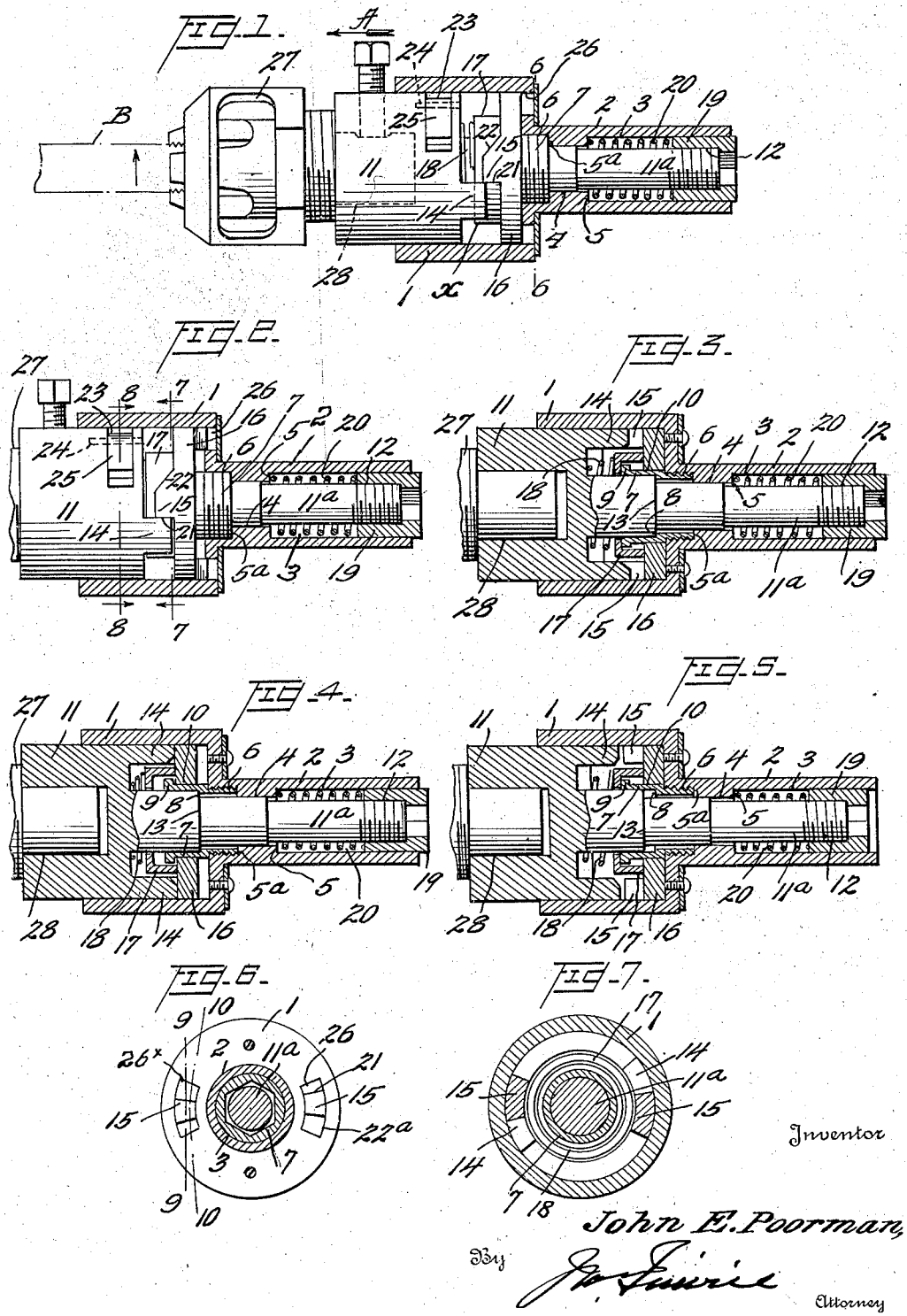

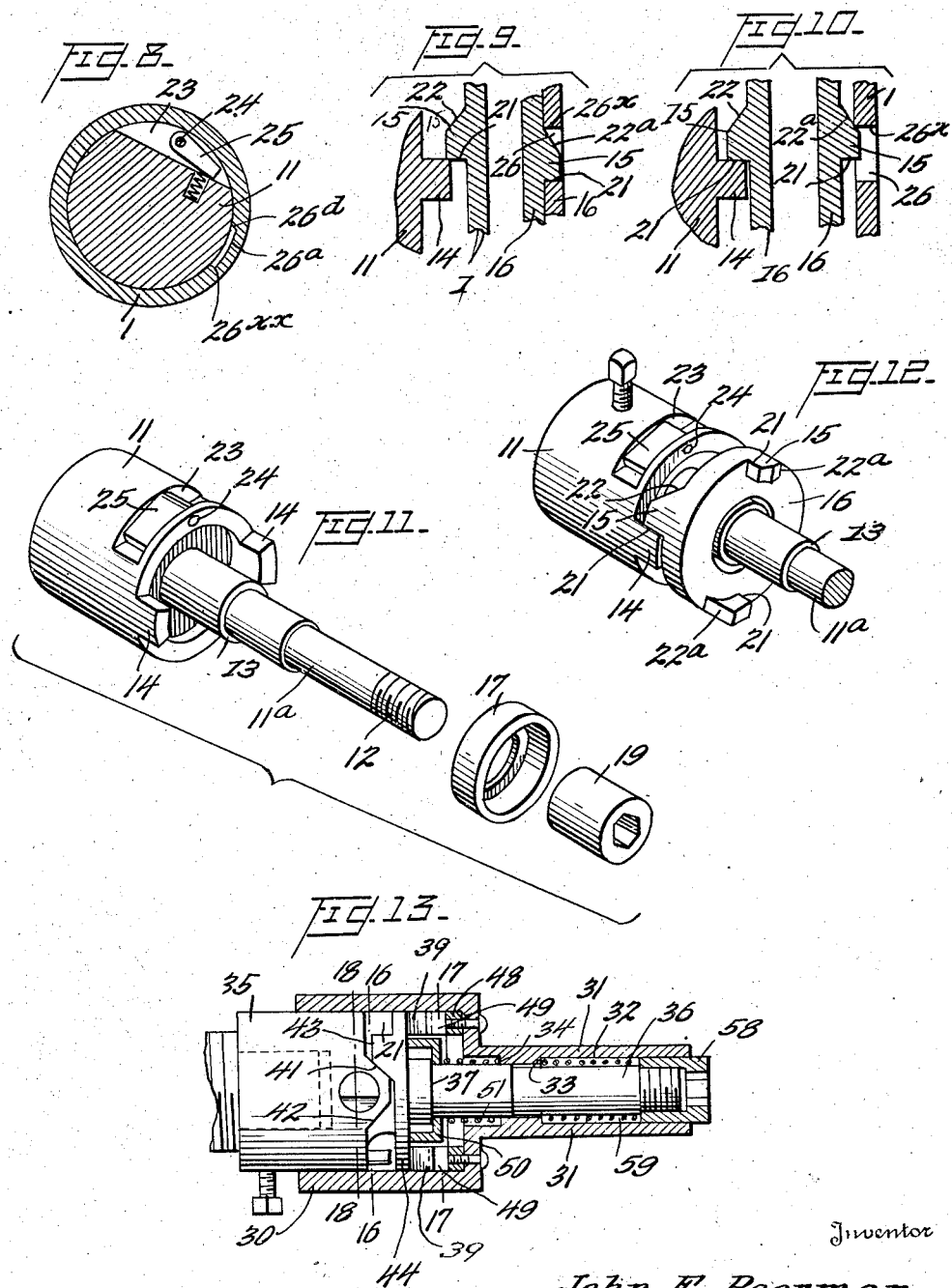

Patented July 2, 1940

2,206,047

UNITED STATES PATENT OFFICE 2,206,047

TAP AND DIE HOLDER

John E. Poorman, Philadelphia, Pa.

Application August 22, 1938, Serial No. 226,165

9 Claims. (Cl. 10—89)

This invention relates to improvements in tap and die holders.

The primary object of the invention is to provide a tap and die holder of such type as will avoid abrupt abutments when the parts are brought into contact when cutting a thread, and thereby conserve accurate assembly and the production of accurate work.

A further object of the invention is to provide a tap and die holder wherein the parts are so arranged as to permit use of the tool in cutting right or left hand threads, this being accomplished by simply releasing certain elements and reversing their position.

I am aware it is old in the art to provide a tap and die holder so constructed and arranged as to permit rearranging the parts to cut right or left hand threads with a tap, but in all such devices known to me, the pins and cooperating stops abruptly abut in the operation of the holder. This abruptness in making contact causes undue wear of the parts and prevents accurate production of the desired length of thread. Because of this hammering of the elements and consequent wear, frequent replacement of the cooperative parts is necessary.

According to my invention, I provide means, so arranged that when a thread is started, the interrelated parts are gradually eased toward each other by cam action and brought into intimate contact, thus avoiding abrupt contacts or hammering of parts, which materially lengthens the life of the tool and results in the production of more accurate work.

Such a tool improves the operation and insures of the work being produced according to a predetermined standard.

These and other objects of the invention will be hereinafter described and particularly pointed out in the claims.

In the accompanying drawings:

Figure 1 is an elevation, partially in section, of the preferred form of the invention, the parts being in normal position.

Figure 2 is a similar view but showing the parts in interlocked position, as when cutting a thread.

Figure 3 is a central vertical section of the tool with the parts illustrated as in Figure 1.

Figure 4 is a similar view, but illustrating the parts as in Figure 2.

Figure 5 is a similar view, but illustrating the parts in position when a thread has been completed and the head free to rotate in the shell.

Figure 6 is a section on the line 6—6 of Figure 1.

Figure 7 is a section on the line 7—7 of Figure 2.

Figure 8 is a section on the line 8—8 of Figure 2.

Figure 9 is a section on the line 9—9 of Figure 6, showing the parts in normal position.

Figure 10 is a section on the line 10—10 of Figure 6, showing the parts interlocked.

Figure 11 is a detail perspective view of the head and associated parts.

Figure 12 is a detail perspective view of the head and the interlocking ring.

Figure 13 is a central vertical section of a modified form of the invention, illustrating the parts in normal position.

Figure 14 is a similar view illustrating the parts in position when for cutting a thread.

Figure 15 is a similar view illustrating the parts in position when a thread is completed and the head free to rotate.

Figure 16 is a detail section on the line 16—16 of Figure 13.

Figure 17 is a detail section on the line 17—17 of Figure 13.

Figure 18 is a detail section on the line 18—18 of Figure 14.

Figure 19 is a detail perspective view of the head shown in Figure 13.

Numeral 1 indicates a cylindrical shell provided with a reduced extension 2, formed with a bore 3. The bore 3 is reduced at 4 to provide a shoulder 5, and inwardly of the shoulder, the bore is threaded at 6.

Fitting in the thread part 6 of the bore and against a shoulder 5$^a$ is a threaded thimble 7, formed with an interior shoulder 8, and a flanged outer end 9. Between the flanged end 9 and the threaded portion of the thimble 7, the periphery of the thimble is smooth to provide a bearing 10, the purpose of which will be hereinafter described.

Fitting in the bore 3 is the stem 11$^a$ of a head 11. The stem is threaded at its outer end as at 12, and intermediate the threads and the head is a shoulder 13.

The head 11 is cylindrical and fits in the shell 1, and on its inner face are lugs 14—14, which cooperate with lugs 15—15 extending from a ring 16, mounted to slide on the smooth portion or bearing 10 of the thimble 7. A cup-shaped washer 17 is mounted on the stem 11$^a$, its cupped edge bearing against the ring 16, while between its opposite face and the head is a spring 18.

Interposed between the shoulder 5 and a nut 19 threaded on the end of the stem 11$^a$ is a spring 20, the tension of which is greater than the tension of the spring 18.

The lugs 15 are duplicated on opposite faces of the ring 16 and each lug has an abrupt end 21, and an inclined rear end, forming cams 22. The respective pairs of lugs 15 on opposite sides of the ring are reversely arranged to accommodate conditions incident to cutting right and left hand threads. For the purpose of clearness, let it be said that the cam surfaces 22 of the forward lug 15 taper from high to low anti-clockwise, when viewed from the front, while the cam surfaces 22$^a$ of the rear lugs taper from high to low, clockwise, when the ring is reversed and viewed from the front, the purpose of which will be hereinafter described.

The rear pair of lugs 15 are seated in openings 26 formed in the rear wall of the shell 1. While I show pairs of lugs extending from the ring, and pairs of lugs on the head, a greater number of lugs may be employed if so desired.

In the periphery of the head adjacent the lugs 14—14 is a groove 23, and mounted therein on a pivot pin 24 is a spring-actuated pawl 25, which engages one or the other of the walls of a groove 26$^a$ formed in the shell 1, it depending upon whether a right or left hand thread is being cut as to which of the walls the pawl engages.

As shown in Figure 3, the head 11 is fitted in the shell so that the lugs 14 and 15 barely overlap, the spring 18 serving to force the cup-shaped washer up against the ring 16, thus holding the latter flat against the rear wall of the shell, with the rear lugs 15 seated in the openings 26. The spring 20 acts to draw the stem, head and ring 16 toward the rear end of the shell until the forward lugs 15 and the lugs 14 slightly overlap, as shown at $x$ in Figure 1, the parts being limited in their inward movement by the shoulder and end of the thimble 7 abutting against the shoulder 13.

The parts shown in Figure 1 are set to cut left hand threads, that is, the cam surfaces 22 of the forward lugs 15 taper from high to low anti-clockwise, as previously described. When the parts are so set, and a tap, conventionally shown at 27, is fitted in the socket 28, in head 11, and the pawl 25 is positioned as shown in Figure 8, the holder can now be operated in a well known way to form a thread, as the holder is gradually fed in the direction of the arrow A, and a rod on which the thread is to be cut is rotated anti-clockwise, looking at the front of the tool, as indicated by the arrow B. The cams 22$^a$ engage the walls 26$^x$ of the openings 26 (Figures 9 and 10) and gradually force the ring 16 away from the rear wall of the shell against the tension of spring 18. This movement of the ring brings the abutting ends 21 of the forward lugs 15—15 and the abutting surfaces of the lugs 14 on the head into intimate abutting relation, and forming an interlock, thus preventing the head rotating, which causes the shell and head to advance together as the threads are cut. When the desired length of thread is about completed, the parts then being in the position shown in Figure 4, the advance movement of the shell ceases, but the rod continues to rotate. As the rod rotates, the tap feeds forward on the threads and carries the head with it, and since movement of the shell has ceased, the spring 18 forces the ring toward the end of the shell and separates the lugs 15 and 14. As shown in Figure 5, when this separation takes place, the lugs are entirely out of the path of each other and the head is free to rotate with the rod. Feeding of the head on the threads compresses the spring 20, and the parts are so held until the holder and rod are separated. Then the rotation of the threaded rod and momentarily the head is reversed, and the longitudinal movement of the tool is reversed until the threaded rod is free of the die. Immediately the reverse rotation of the rod and head takes place, the pawl 25 flies out and engages the wall 26$^{xx}$ (see Figure 8) of the groove 26$^a$, which locks the head and shell together until the thread is free of the tap, whereupon the spring 20 returns the parts to normal position.

If a right hand thread is to be cut, the nut 19 is removed; the head 11 and its stem are withdrawn; the ring 16 is reversed so as to present the set of oppositely inclined cams toward the front to cooperate with the lugs 14 and the cam surfaces of the rear lug with the opposite walls of the slots 26; and the pawl 25 is turned on its pivot to face in the opposite direction to cooperate with the opposite wall 26$^d$ of the groove 26$^a$.

These changes having been made, the parts are reassembled and the operation of cutting a right hand thread is exactly the same as previously described, except of course the rod on which the thread is to be cut is rotated in the opposite direction.

In the form of the invention illustrated in Figures 13 to 19 the same results are obtained, but with differently arranged parts.

In these figures, 30 indicates a shell having a reduced extension 31, provided with a bore 32, having shoulders 33 and 34. Fitting in the shell is a cylindrical head 35 provided with a stem or spindle 36, having a shoulder 37. The head is provided with two projecting lugs 39 having oppositely inclined cam surfaces 41 and 42. These latter lugs cooperate with lugs 43 extending from a ring 44, mounted to slide on the stem 36. The lugs 43 are duplicated on opposite sides of the ring, and each has an abrupt abutting end 45 and a receding cam opposite end 46. The cams on opposite faces of the ring extend in opposite directions in precisely the same way and for the same purpose as that described in connection with the ring 16. The ring 44 is provided with notches 44$^a$ which fit over projections 35$^a$ on the stem or spindle 36. The notches permit slipping the ring 44 over the projections, and when the ring is turned so that the notches are out of alignment with the projections, the latter serve to retain the ring in proper operative relation with the head.

Secured by screws 47 on the rear wall of the shell 30 is a ring 48, provided with projecting lugs 49, each having abrupt abutting edges 49$^a$, which cooperate with the lugs 43. Mounted on the stem 36 and against the shoulder 37, is a cup-shaped washer 50, the cup end bearing against the ring 44 and held against the same by a spring 51 interposed between the washer and shoulder 34.

The head 35 is provided with an opening 52, in which is seated a pawl 53, forced outwardly by a spring 54. The pawl is formed on its outer end with an abrupt engaging end 55, beveled downwardly as at 56 to ride freely when the head is rotated in one direction. The pawl engages the respective walls of a groove 57, formed on the inner side of the shell 30.

Interposed between the shoulder 33 and a nut 58 threaded on the end of the stem, is a spring 59, the purpose of which is to draw the head and ring into cooperative relation, as shown in Figure 13.

In operation, in this form of the invention (Figures 13 to 19), the parts are assembled as shown in Figure 13. When the holder is advanced and the rod on which the thread is to be cut is rotated, the cam surfaces 42 engage the cam surfaces 46 of the forward lugs 43 and force the ring 44 against the tension of spring 51 toward the ring 48, thus bringing the abrupt ends of the rear lugs 43 of the ring 44 toward the ring 48, and the lugs 49 into intimate contact, thus locking the head and shell together.

When the desired length of thread is cut and the advance movement of the holder ceases, the rod still continues to rotate and the tap and head are fed forward on the formed threads and against the tension of spring 59. As the head moves forward, the spring 51 forces the ring 44 forward and separates the rear lugs 43 of said ring from the lugs 49, hence allowing the ring 44 and head to rotate freely. Then when the rotation of the threaded rod is reversed, the tap and head rotate in the same direction, the head only momentarily, then the pawl drops into the groove 57 and engages a wall thereof and stops rotation of the head, the head and shell being again locked together. When the threaded rod is withdrawn, the spring 59 returns the parts to normal position, shown in Figure 13.

If it be desired to cut a reverse thread, the nut 58 is removed; the head 35 and ring 44 are removed; and the ring 44 reversed to present the opposite cam lugs in position to cooperate with the cam surfaces of lugs 39. The pawl 53 is reversed to cooperate with the opposite wall of the groove 57. The parts are again assembled and the operation is the same as previously described, except of course a reversed thread will be cut.

From the foregoing description, it will be seen that I have provided a tap and die holder with the parts so arranged that they may be conveniently and readily adjusted to cut right or left hand threads. Furthermore, the construction and arrangement of the respective lugs is such that when pressure and pull between the head and shell takes place, when cutting of the threads is started, and the lugs are brought into active contact, the movement is gradual. Hence pounding or hammering and consequent wear between the parts is reduced to a minimum, accuracy is maintained and the life of the tool is prolonged. The cam action, incident to bringing the lugs into cooperative relation, insures a gradual movement between the parts, while the arrangement of the springs insures a yielding or cushion action when the elements are returned to normal position.

Due to the cams and springs, at no time are the parts subjected to undue wear, a feature which is vitally important in a tool of this character.

What I claim is:

1. In a tap and die holder, a shell, a head mounted in and initially movable rotatively with respect to the shell, an element arranged between the head and shell, said element being axially movable in the initial relative movement of the head and means to cause the axial movement of the element to be accomplished gradually and automatically to interlock the head and shell.

2. In a tap and die holder, a shell, locking means in the shell, a head mounted in the shell and adapted to receive a threaded die, an element having means to cooperate with the locking means in the shell, said element being mounted for movement axially of the head to interconnect said locking means, the axial movement of the element being responsive to an initial rotative movement of the head in the shell, and means on the element to interlock said element and head following the initial rotative movement of the head, whereby the head is locked against rotative movement in the shell to provide for a threading operation.

3. A tap and die holder, including a shell having a bore, a head fitted in the shell and provided with a stem fitted in the bore, lugs projecting from the head, a ring loosely mounted within the shell, said ring having lugs extending from opposite faces thereof, each lug on the ring having an abrupt end and a cam surface receding therefrom, the cam surfaces of the lugs cooperating with an abutment on the shell and the abrupt ends of the lugs cooperating with the lugs on the head when rotary pressure is applied to the head, whereby to gradually bring the lugs of one face of the ring into intimate contact with the lugs on the head to form an interlock between the head and shell, and springs to hold the elements in operative relation.

4. A tap and die holder, including a shell, a head having a stem, a ring interposed between the head and shell, said ring having cam lugs, lugs extending from the head, a spring on the stem acting on the ring to normally hold the lugs apart, the cam lugs cooperating with the lugs on the head and the shell to force the ring longitudinally on the stem to bring the lugs into intimate contact, whereby to form a lock between the head and shell when rotary pressure is applied to the head, and a spring between the shell and stem to normally hold the head in the shell.

5. A tap and die holder, including a head and a shell, means including a series of lugs between the shell and head to gradually and automatically lock the shell and head together following rotary pressure in one direction applied to the head, a spring for holding said means in normal operative relation, and a spring between the shell and head to retain the head within the shell.

6. A tap and die holder, comprising a shell formed with a bore and slots, a head fitted in the shell and having a stem seated in the bore, lugs extending from the head, a ring between the shell and head, said ring having reversed cam-shaped lugs on opposite faces, the cam lugs on the rear face fitting in the slots in the shell, the cam lugs on the front face of the ring cooperating with the lugs on the head, a spring for holding the lugs on the head and on the front of the ring separated, a spring on the stem to normally draw the head within the shell, the cam-shaped lugs in the slots engaging walls of the latter when rotary pressure is applied to the head, whereby to bring the lugs on the forward face of the ring into intimate contact with the lugs on the head to form an interlock between the head and shell when forming a screw thread.

7. A tap and die holder, comprising a shell having an extension formed with a bore and end slots, the bore having a shoulder, a head fitted in the shell and provided with a stem fitting in the bore and having a shoulder, lugs on the inner end of the head, a thimble mounted in the inner end of the bore and against the shoulder, a washer on the stem between the head and thimble, a spring between the head and washer, a ring between the washer and the rear wall of the shell, said ring having lugs on opposite faces, each lug having an abrupt end and a tapered opposite end forming a cam, the rear lugs fitting in the slots in the shell, the cam ends thereof engaging the walls of the slots and gradually forcing the ring forward and the abrupt ends of the forward lugs thereon into intimate contact with the lugs on the head when rotary pressure in one direction is applied in forming a thread.

8. A tap and die holder, including a shell and a head, a slidable ring interposed between the end wall of the shell and the head, said ring having a series of lugs on opposite faces, said lugs having oppositely inclined cam surfaces, the lugs on the rear of the ring engaging slots formed in the shell, the lugs on the front face of the ring engaging lugs formed on the inner end of the head, a spring to normally force the ring toward the rear of the shell and hold the lugs on the head and front of the ring apart, and a spring mounted between the shell and head to normally draw the head in the shell, the lugs on the rear of the ring engaging walls of the slots to force the ring forward and bring the forward lugs into intimate contact with the lugs on the head when rotary pressure in one direction is applied to the head.

9. A tap and die holder, including a shell having an extension formed with a bore, lugs extending inwardly from the rear wall of the shell, a head having a stem fitting in the bore, a ring interposed between the head and lugs, the ring having lugs on opposite faces, each lug having an abrupt end and a tapered end and reversely arranged on the opposite faces of the ring, a spring which normally forces the ring toward the head to bring the forward tapered lugs into relation with the beveled lugs on the head, and a spring on the stem to normally draw the head and ring toward the rear of the shell, whereby when rotary pressure in one direction is applied to the head when cutting a thread the beveled surfaces of the contacting lugs will gradually force the abrupt ends of the lugs on the rear of the ring into intimate contact with the lugs on the shell and form an interlock between the head and shell.

JOHN E. POORMAN.